(12) United States Patent
Komura et al.

(10) Patent No.: US 7,275,612 B2
(45) Date of Patent: Oct. 2, 2007

(54) FIX STRUCTURE OF BATTERY FOR VEHICLES

(75) Inventors: Wataru Komura, Hiroshima (JP); Shingo Usui, Kakogawa (JP)

(73) Assignees: Nishikawa Rubber Co., Ltd., Hiroshima (JP); Sanyo Electric Co., Ltd., Osaka (JP)

( * ) Notice: Subject to any disclaimer, the term of this patent is extended or adjusted under 35 U.S.C. 154(b) by 456 days.

(21) Appl. No.: 10/932,116

(22) Filed: Sep. 2, 2004

(65) Prior Publication Data

US 2005/0053828 A1    Mar. 10, 2005

(30) Foreign Application Priority Data

Sep. 4, 2003  (JP) ............................. 2003-312049
May 17, 2004 (JP) ............................. 2004-146401

(51) Int. Cl.
    *B60R 16/04* (2006.01)

(52) U.S. Cl. .................. 180/68.5; 429/99; 429/100; 224/902; 411/900; 411/427; 411/432

(58) Field of Classification Search ............... 180/68.5; 429/99, 100, 129, 130, 153, 163, 177; 244/902, 244/555, 556, 557; 403/287; 411/542, 900, 411/901, 902, 903, 427, 432; 280/643, 650
See application file for complete search history.

(56) References Cited

U.S. PATENT DOCUMENTS

| | | | | |
|---|---|---|---|---|
| 2,874,657 A * | 2/1959 | Austin | .......................... | 111/7.1 |
| 3,894,607 A * | 7/1975 | Brock | ......................... | 180/68.5 |
| 4,129,194 A * | 12/1978 | Hammond et al. | ......... | 180/68.5 |
| 4,310,273 A * | 1/1982 | Kirrish | ......................... | 411/338 |
| 4,883,399 A * | 11/1989 | MacLean | ..................... | 411/431 |
| 5,167,395 A * | 12/1992 | Pearman et al. | ............ | 248/551 |
| 5,215,341 A * | 6/1993 | Namakura et al. | ........... | 285/423 |
| 5,217,202 A * | 6/1993 | Phillips | ...................... | 251/144 |
| 5,340,258 A * | 8/1994 | Simon | ......................... | 411/535 |
| 5,492,388 A * | 2/1996 | Kawasaki | .............. | 296/193.02 |
| 5,577,872 A * | 11/1996 | Nakamura | .................... | 411/432 |
| 5,904,383 A * | 5/1999 | van der Wal | ............ | 292/307 B |
| 5,918,692 A * | 7/1999 | Sekita et al. | .................. | 180/56 |
| 5,948,298 A * | 9/1999 | Ijaz | ............................. | 219/209 |
| 6,196,781 B1 * | 3/2001 | Yang | .......................... | 411/384 |
| 6,227,322 B1 * | 5/2001 | Nishikawa | ................. | 180/68.5 |
| 6,350,093 B1 * | 2/2002 | Petersen et al. | ........... | 411/82.1 |
| 6,585,447 B2 * | 7/2003 | Schwarzbich | ............ | 403/374.3 |
| 6,595,734 B2 * | 7/2003 | Duran et al. | ................. | 411/427 |
| 6,808,181 B1 * | 10/2004 | Shemtov | ..................... | 277/606 |

(Continued)

*Primary Examiner*—Christopher P. Ellis
*Assistant Examiner*—John D Walters
(74) *Attorney, Agent, or Firm*—Wenderoth, Lind & Ponack, L.L.P.

(57) ABSTRACT

A sealing member is composed of upper and lower holders which are molded members formed of rubber or resin. The upper holder has a stopper having a tubular shape with a flange inserted on its inner periphery. The lower holder has an inserted nut and outer threaded member on its inner and outer peripheries. In fixing a battery, after the outer threaded member of the lower holder is secured to a seat of a body frame by being screwed therein, the case is attached so that an expanded portion covers the lower holder, and then the upper holder is attached in a hole of the expanded portion. Subsequently, a bolt is presented through a battery holder, and is tightened by being screwed into the nut of the lower holder.

20 Claims, 5 Drawing Sheets

U.S. PATENT DOCUMENTS 6,854,543 B2 * 2/2005 Rowley et al. ............ 180/68.5
6,918,492 B2 * 7/2005 Ostergaard .................. 209/326
6,941,721 B2 * 9/2005 Lind ........................ 52/786.13
7,022,432 B2 * 4/2006 Asahina et al. ............. 429/179

* cited by examiner

FIX STRUCTURE OF BATTERY FOR VEHICLES

BACKGROUND OF THE INVENTION

1. Technical Field

The present invention relates to a structure for fixing a battery installed in a vehicle, particularly in a hybrid car.

2. Description of the Related Art

Figure 1:
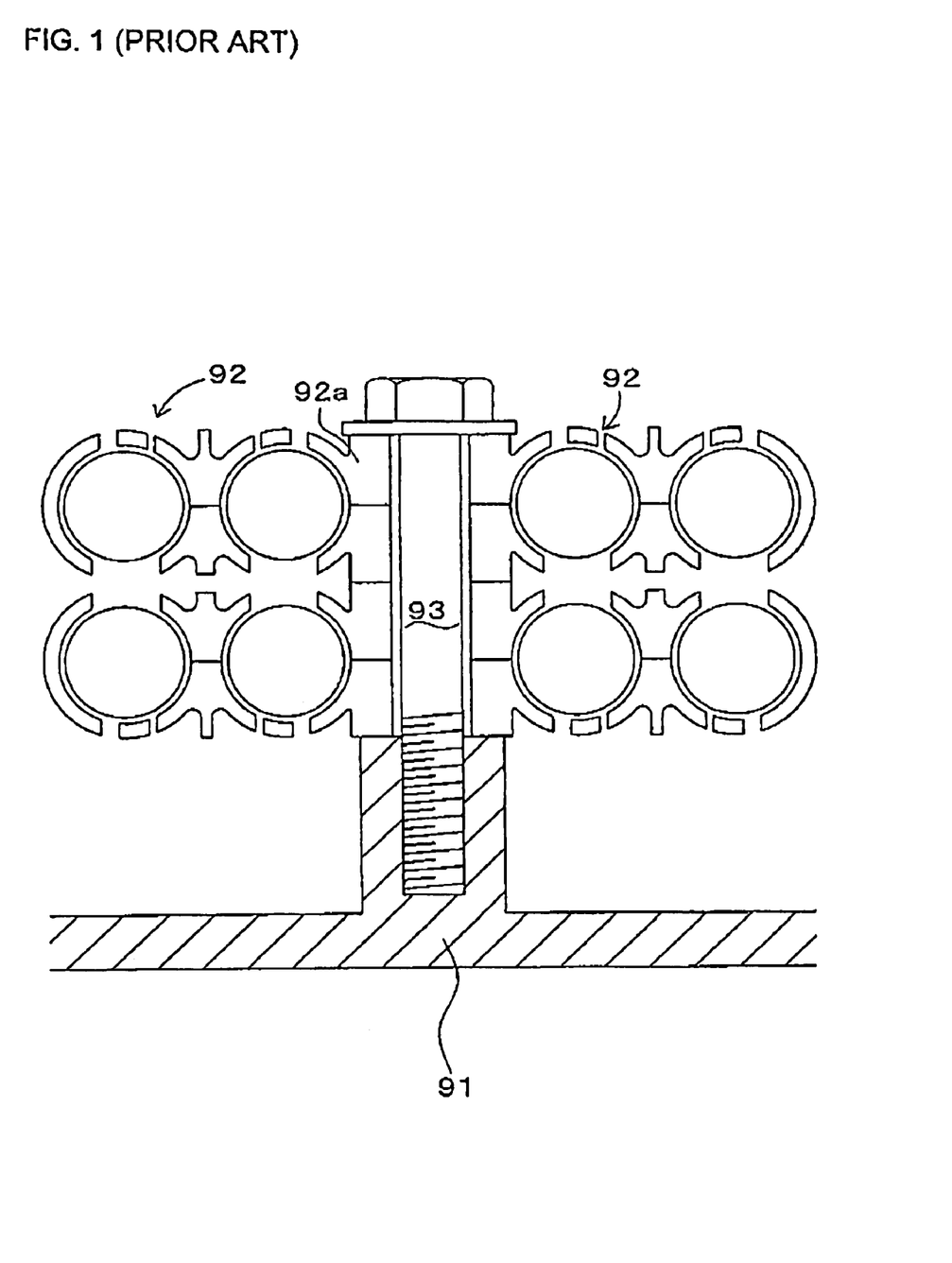
FIG. 1 is a cross-sectional view showing a conventional fixing structure of a battery.

Conventionally, a battery installed in a vehicle, particularly in a hybrid car, is fixed by connecting a battery holder 92a with a battery 92 attached thereto to a body frame, for example a body frame 91 under a seat, with bolts 93 at several locations as shown in FIG. 1.

SUMMARY OF THE INVENTION

The conventional battery holder is merely fixed directly to the body frame as mentioned above, however, water resistance, vibration isolation and insulation of the battery is not taken into consideration.

The object of the present invention is to provide a structure for fixing a battery for vehicles with water resistance, vibration isolation and insulation.

A fixing structure of a battery for vehicles according to the first aspect of the present invention comprises a case, a sealing member, and a bolt. The case is attached to a body frame. The battery is attached to the case. The sealing member is made of rubber or resin. The sealing member is attached to the rim of an attachment hole opened in the case for sealing. The sealing member has a metal nut formed by insert molding therein on the inner peripheral side. The bolt fixes the battery holder by being screwed to the nut of the sealing member via the battery holder. The battery holder is supported by and in contact with the sealing member located at least at one location of the case.

With this construction, the sealing member seals the attachment hole, thus, it is possible to provide water resistance of the battery. In addition, since the sealing member of rubber or resin supports the battery so that the battery is not in contact with a metal component, it is possible to provide vibration isolation and insulation.

In the battery fixing structure for vehicles according to a second aspect of the present invention, the sealing member includes an upper holder attached onto the upper rim surface of the attachment hole opened in the case and a lower holder in contact with the lower rim surface of the attachment hole. The lower holder has the nut formed by insert molding therein on the inner peripheral side and an external screw on the outer peripheral side so as to be screwed to the frame.

With this construction, the sealing member includes the separated upper and lower holders which are in contact with upper and lower rim surfaces of the hole, and thus, attachment of them onto the rim of the hole can be easy. In addition, since the upper and lower holders sandwich the rim in the case to tighten the case, it is possible to prevent the upper and lower holders from rattling.

In the battery fixing structure for vehicles according to a third aspect of the present invention, protruding and recessed portions are formed on the outer periphery of the nut.

With this construction, the nut is prevented from rotating. Accordingly, the nut does not rotate with the bolt when the bolt is tightened by being screwed therein.

In the battery fixing structure for vehicles according to a fourth aspect of the present invention, the upper holder has a stopper of a tubular shape with a flange formed by insert molding therein on the inner periphery, and the risen upper end surface of the nut becomes in contact with or closer to the lower end of the stopper as the bolt is screwed.

With this construction, the stopper of the upper holder thrust by the battery regulates the rise of the nut when the bolt is tightened by being screwed therein.

In the battery fixing structure for vehicles according to a fifth aspect of the present invention, an O-ring for sealing is attached onto the contact surface of the lower holder.

This construction ensures sealing.

In the battery fixing structure for vehicles according to a sixth aspect of the present invention, retaining portions, which are spaced at an appropriate interval in the circumferential direction to retain the nut, are formed integrally with the lower holder.

With this construction, the lower holder can be rotated by an attachment tool while the attachment tool is inserted between the retaining portions.

In the battery fixing structure of a battery for vehicles according to a seventh aspect of the present invention, an upper holder is made of resin, and has a protrusion formed by a gate. The protrusion is formed in a recessed region, the depth of which is larger than the height of the protrusion.

With this construction, the protrusion formed by a gate does not interfere with secure attachment of the battery holder.

With the battery fixing structure for vehicles according to the present invention, the sealing member seals the attachment hole formed in the case, and thus, it is possible to make the case water resistant. In addition, since the sealing member of rubber or resin supports the battery so that the battery is not in contact with a metal component, it is possible to provide vibration isolation and insulation, and therefore leakage can be prevented.

With the battery fixing structure for vehicles according to the second aspect of the present invention, the sealing portion includes the separated upper and lower holders to attach them individually, and thus, assembling the structure can be easy. In addition, since the upper and lower holders sandwich the rim in the case to tighten the case, it is possible to prevent the respective holders from rattling, and therefore, the case can be firmly fixed.

With the battery fixing structure for vehicles according to the third aspect of the present invention, the nut does not rotate with the bolt when the bolt is tightened by being screwed therein, therefore, the case can be surely tightened.

With the battery fixing structure for vehicles according to the fourth aspect of the present invention, the stopper regulates the rise of the nut when the bolt is tightened by being screwed therein, therefore, it is possible to prevent over rise of the nut.

With the battery fixing structure of a battery for vehicles according to the fifth aspect of the present invention, attachment of the O-ring further ensures sealing.

With the fixing structure of a battery for vehicles according to the sixth aspect of the present invention, an attachment tool rotates the lower holder while the attachment tool is inserted between the retaining portions, and therefore, it is possible to screw the external screw of the lower holder into a seat.

With the battery fixing structure for vehicles according to the seventh aspect of the present invention, a process of removing the protrusion can be eliminated, and as a result, it is possible to reduce costs.

The above and further objects and features of the invention will be more fully apparent from the following detailed description in conjunction with the accompanying drawings.

DETAILED DESCRIPTION OF THE PREFERRED EMBODIMENTS

Figure 2:
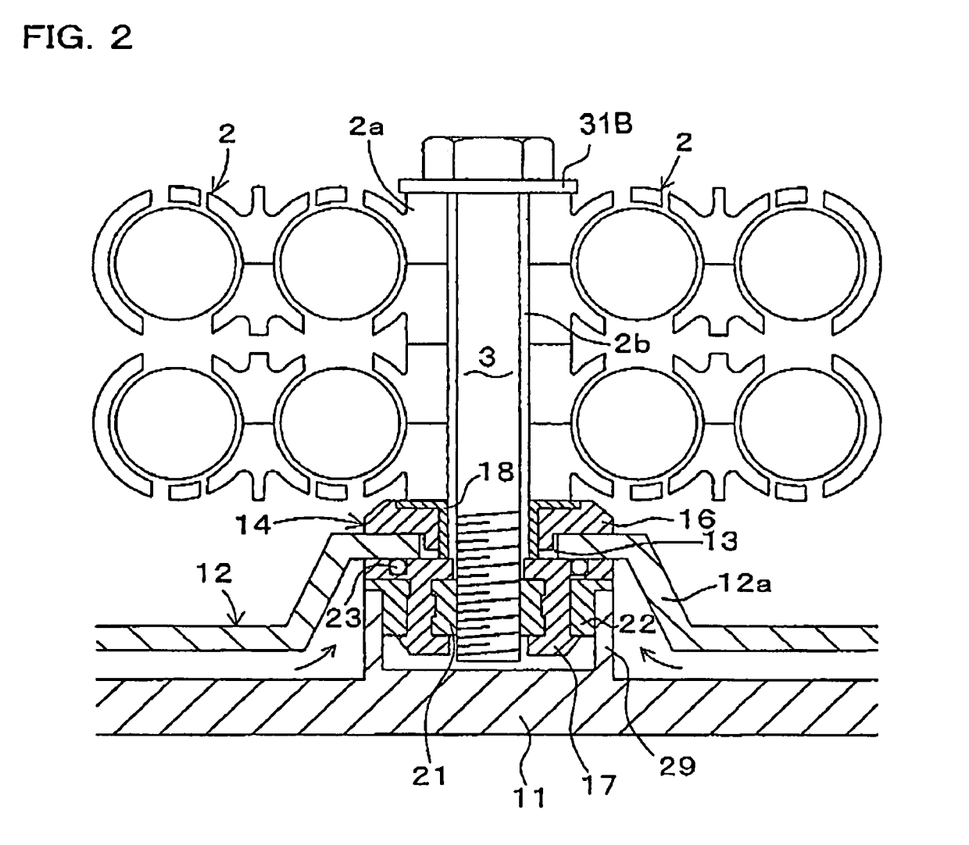
FIG. 2 is a cross-sectional view showing a fixing structure of a battery according to the present invention.

FIG. 2 shows a fixing structure of a battery 2 according to the present invention. The fixing structure of the battery 2 is composed of a water resistant case 12 attached onto a body frame 11, a sealing member 14 which is attached to a hole 13 opened in an expanded portion 12a of the case 12 to seal the hole 13, and a bolt 3 which connects a battery holder 2a to the body frame 11 and the case 12. The sealing member 14 is composed of an upper holder 16 attached onto the upper rim surface of the attachment hole 13 opened in the case 12 and a lower holder 17 in contact with the lower rim surface of the attachment hole.

Figure 3:
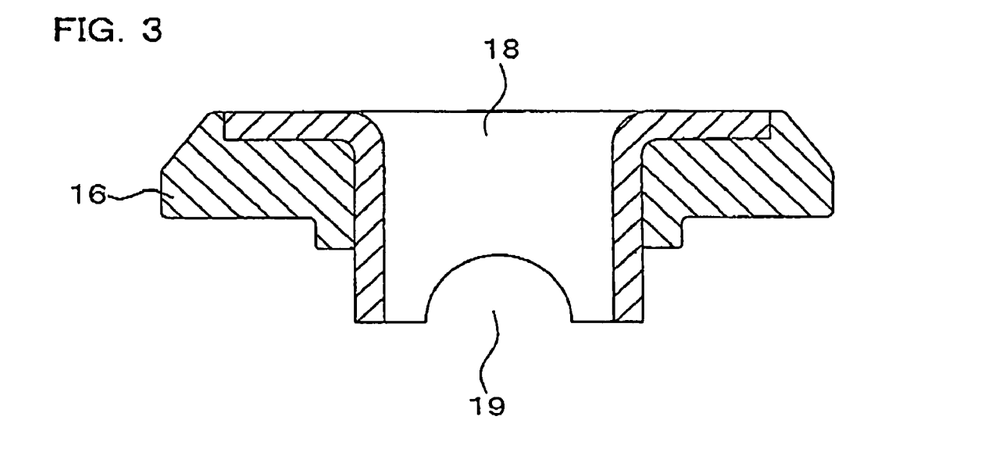
FIG. 3 is a vertical cross-sectional view showing an upper holder.

As shown in FIG. 3, the upper holder 16 is a molded member of rubber or resin with a metal stopper 18 of a tubular shape with a flange formed by insert molding therein on the inner periphery. The lower portion of the stopper 18 is formed in a tubular shape and protrudes downward in FIG. 3. Semicircular-shaped snatch portions 19 are formed to oppose each other in the lower portion.

Figure 4:
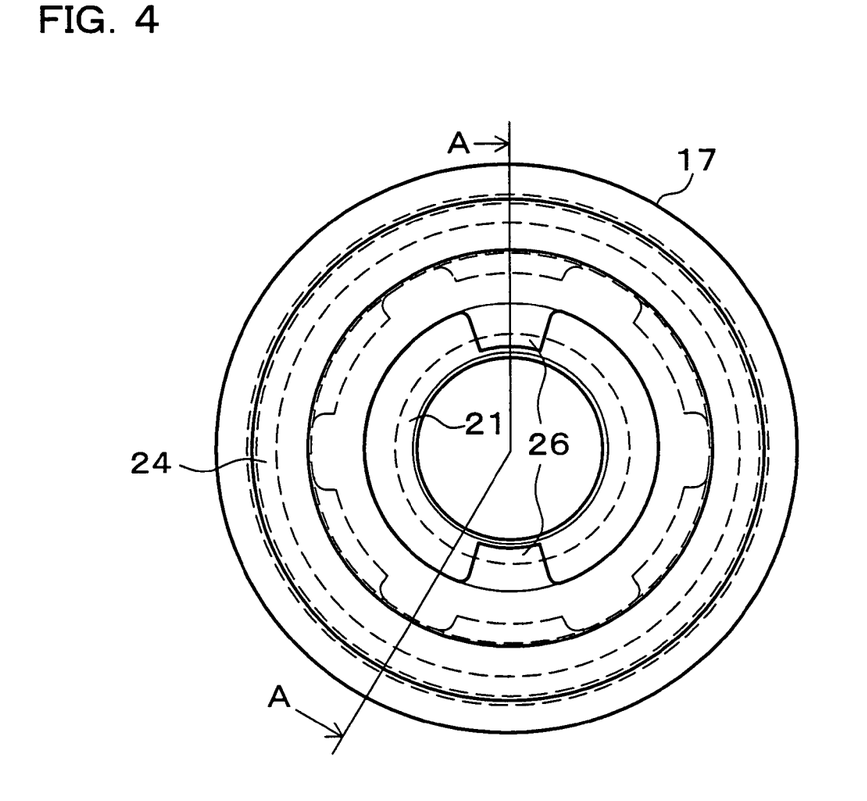
FIG. 4 is a plan view showing a lower holder.
Figure 5:
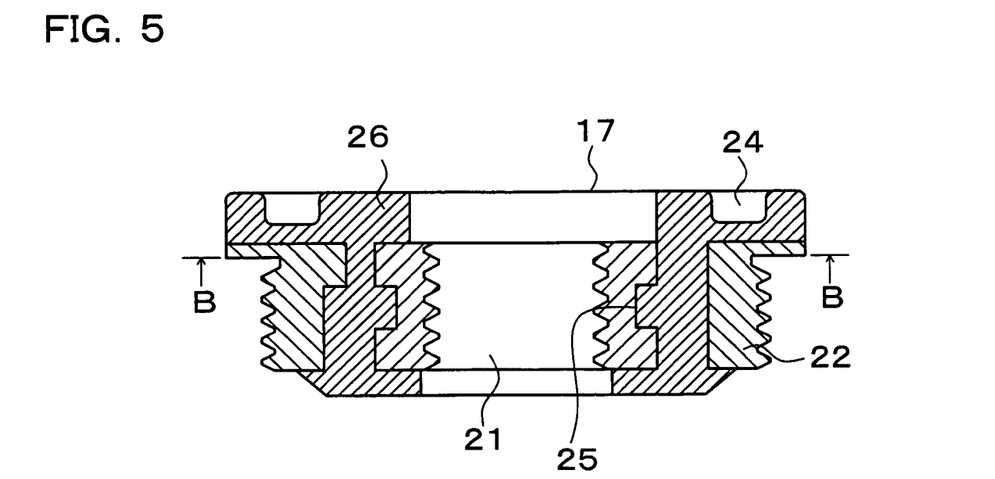
FIG. 5 is a cross-sectional view taken along the line A-A of FIG. 4.
Figure 6:
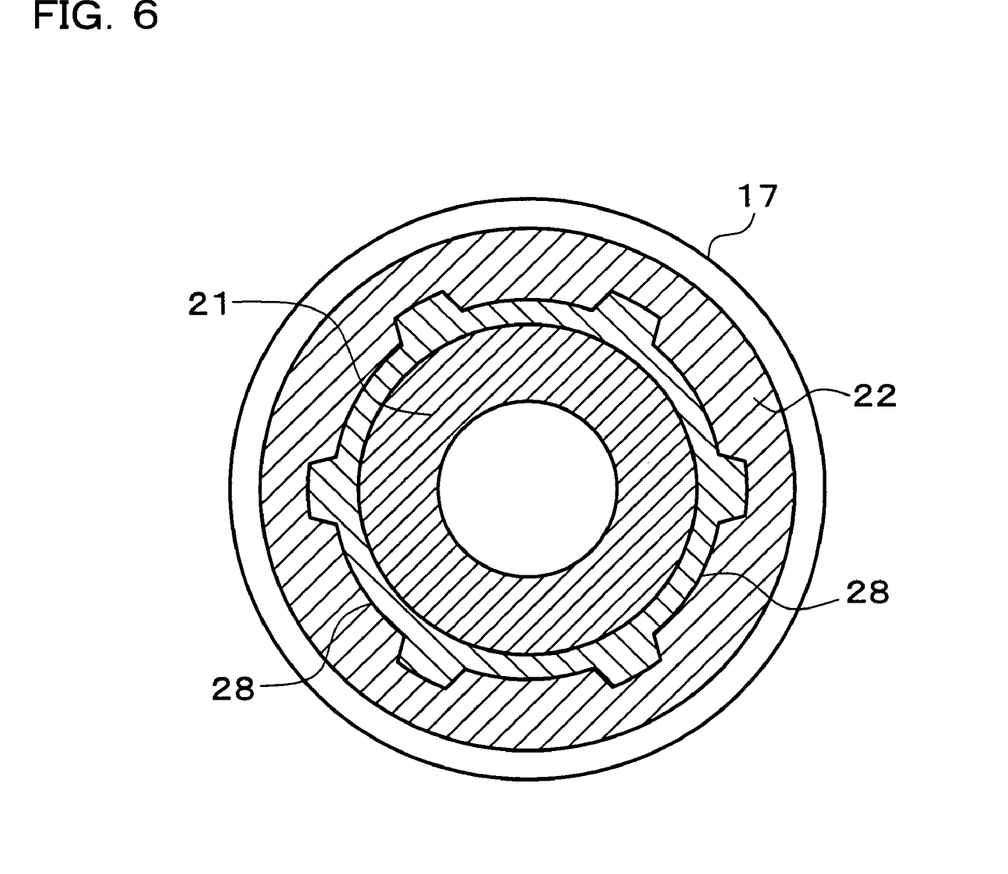
FIG. 6 is a cross-sectional view taken along the line B-B of FIG. 5.

As shown in FIGS. 4 to 6, the lower holder 17 is a molded member of rubber or resin with a metal nut 21 on the inner periphery and an external screw 22 on the outer periphery formed by insert molding therein. An annular groove 24 is formed on the upper end surface. An O-ring 23 is attached in the annular groove 24. An annular groove 25 is provided on the outer periphery of the nut 21. Asperities are formed on the outer peripheral surface by a knurling process. The upper end surface is exposed other than the parts which are covered by retaining portions 26 of protruding pieces. The retaining portions 26 are formed integrally with the molded member and protrude so as to oppose each other.

With the external screw 22, recessed parts 28 are formed at the same interval in the circumferential direction on the inner periphery, and a threaded portion is formed on the outer periphery so as to threadedly engage with an internal threaded portion formed on the seat 29 of the body frame 11.

The fixing structure according to this embodiment is configured as mentioned above, and is assembled as follows.

The lower holder 17 is attached by screwing the external screw 22 of the lower holder 17 in the seat 29 of the body frame 11 to the limit as shown in FIG. 2.

It is preferable that the lower holder 17 is rotated by an attachment tool (not shown) while the attachment tool is inserted between the retaining portions 26 when screwed. The reason is that, as the attachment tool is rotated, it engages with the attachment portions 26, and thus rotates the lower holder 17 to screw the external screw 22 in the seat 29. This can make attachment of the lower holder 17 to the seat 29 relatively easy.

After attachment of the lower holder 17, the O-ring 23 is seated in the annular groove 24 on the upper end of the lower holder. However, the lower holder 17 may be attached to the seat 29 after the O-ring 23 is attached to the annular groove 24.

Subsequently, the case 12 is positioned and attached onto the frame 11 so that the expanded portion 12a covers the lower holder 17. After that, the upper holder 16 is fitted into the hole 13 of each expanded portion 12a. The battery holder 2a with the battery 2 attached thereon is positioned and attached onto the upper holder 16 so that the attachment hole 2b is in alignment with the hole 13. Then, the bolt 3 is passed through the washer 31B, and is connected to the nut 21 of the lower holder 17 by being screwed. The nut 21 rises as the bolt 3 is screwed, and thus, the lower holder 17 is thrust onto the rim of the hole. The upper and lower holders 16 and 17 sandwich and fix the rim of the hole. The stopper 18 regulates the rise of the nut 21. Accordingly, the rise stops when the nut 21 abuts the stopper 18. After the nut 21 is in press contact with the stopper 18 when the bolt 3 is tightened by being screwed therein, both the upper and lower holders 16 and 17 are in press contact with the rim of the hole, and thus further displacement stops. Accordingly, further press deformation of the resin portion of each holder stops.

With the fixing structure according to this embodiment, the upper and lower holders 16 and 17 are in press contact with the rim of the hole, and the O-ring 23 engages with the rim of the hole to seal the rim of the hole. Thus, it is possible to prevent water from contacting of the battery 2 attached to the battery holder 2a. Even when water comes in the direction shown by an arrow of FIG. 2, the rim is sealed as mentioned above, and therefore, water is unable to enter the case. Although the battery holder 2a is supported by and in contact with the upper holder 16, the upper holder 16, which is a molded member of rubber or resin, has elasticity, and thus vibration isolation is provided. Additionally, the battery holder 2a is not in contact with the body frame 11 and the case 12 made of metal, and thus insulation is also provided.

As for assembling the sealing member 14, after the lower holder 17 is attached to the seat 29 of the body frame 11 by being screwed thereon, the case 12 is attached, and then the upper holder 16 is attached onto the rim of the hole of the expanded portion 12a. The separated upper and lower holders 16 and 17 can make attachment of them onto the rim of the hole easy. In addition, since the upper and lower holders 16 and 17 sandwich and tighten the rim of the hole, it is possible to prevent the holders 16 and 17 from rattling. Furthermore, with the nut 21 and outer screw 22 of the lower holder 17, asperities are formed on the contact part with resin or rubber by a knurling process or in the annular groove 24 and retaining portion 26. Accordingly, separation of the nut 21 and outer screw 22 from a rubber or resin portion is less prone to occur, and the nut 21 does not rotate with the bolt 3 when the bolt 3 is tightened by being screwed therein, and thus, this arrangement can ensure tightening the case. Additionally, the stopper 18 of the upper holder 16 regulates the rise of the nut 21 when the bolt 3 is screwed to tighten the case. Therefore, it is possible to prevent separation of the nut 21 from the lower holder 17 caused by over rise of the nut 21. The lower holder 17 of the aforementioned embodiment has the external screw 22 made of metal, however, the external screw 22 may be formed integrally with the lower holder 17. When the external screw 22 is made of resin, the sealing member can be lightweight and provide higher insulation, and it is possible to reduce costs.

Figure 7:
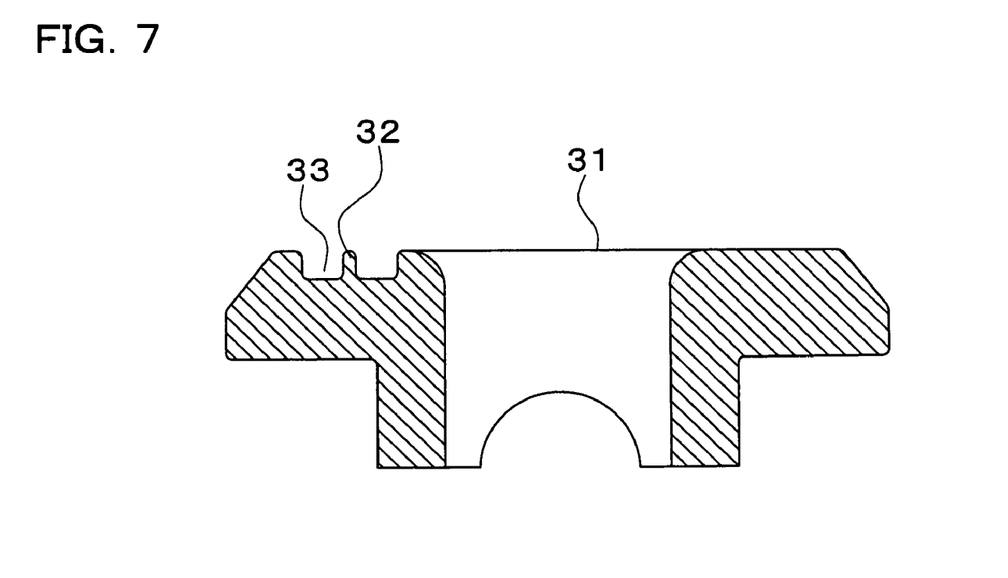
FIG. 7 is a vertical cross-sectional view showing another example of an upper holder.

FIG. 7 shows another example of the upper holder. The difference between this upper holder 31 and the upper holder 16 shown in FIG. 3 is that the stopper 18 is omitted and the whole upper holder is made of resin. In this figure, the numeral 32 represents a protrusion formed by a gate. It is preferable that gates are formed at a plurality of locations on a protruding part on the upper surface in consideration of the flowability of resin during molding. The protrusion 32 is preferably removed after molding, but removing increases man-hour or machine-hour, and cost. With the upper holder 31 shown in FIG. 7, in order not to remove the protrusion 32, a recessed region 33 the depth of which is larger than the height of the protrusion 32 is formed in a region where the protrusion 32 is formed so that the protrusion 32 does not protrude from the recessed region 33.

Figure 8:
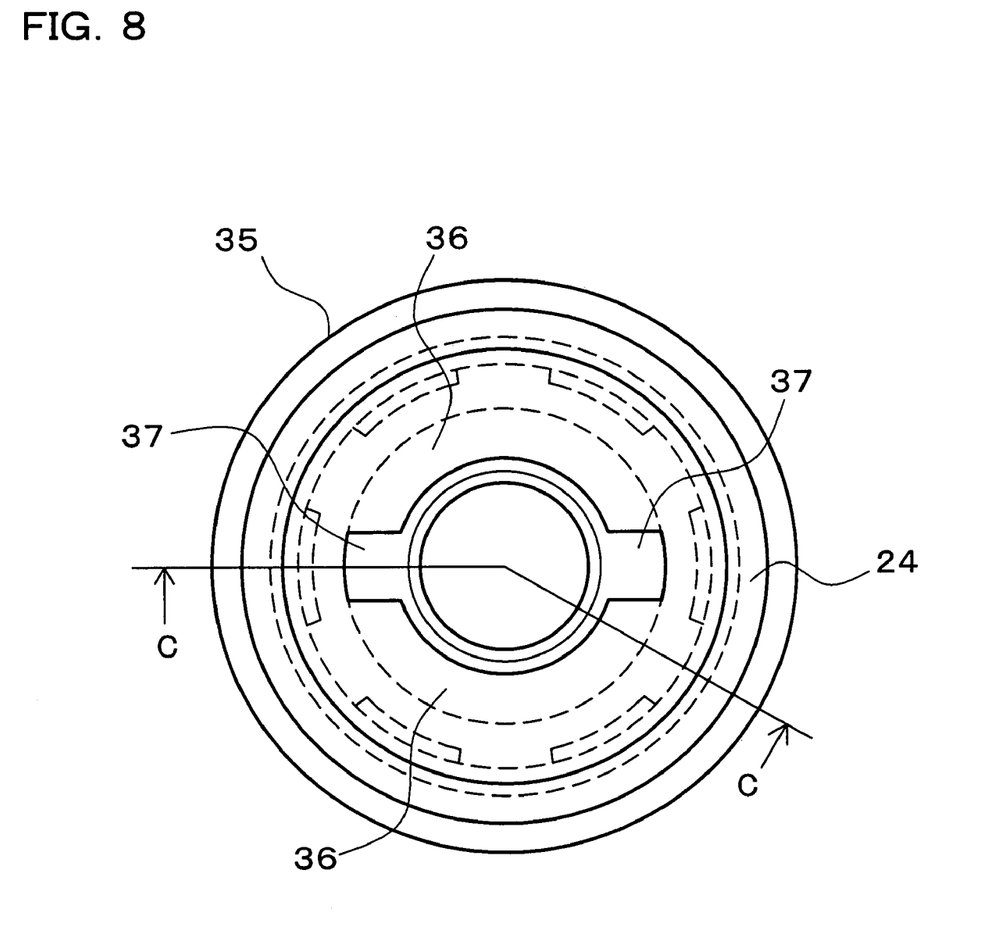
FIG. 8 is a plan view showing another example of a lower holder.

FIG. 8 shows another example of the lower holder. The difference between this lower holder 35 and the lower holder 17 shown in FIGS. 4 and 5 is that a recessed section 37 is formed between retaining portions 36 which correspond to retaining portions 26 extended in the circumferential direction. It is preferable that the lower holder 35 is rotated by an attachment tool (not shown) while the attachment tool is inserted in the recessed sections 37 when screwed similarly to the lower holder 17. The reason is that attachment can be relatively easy.

Figure 9:
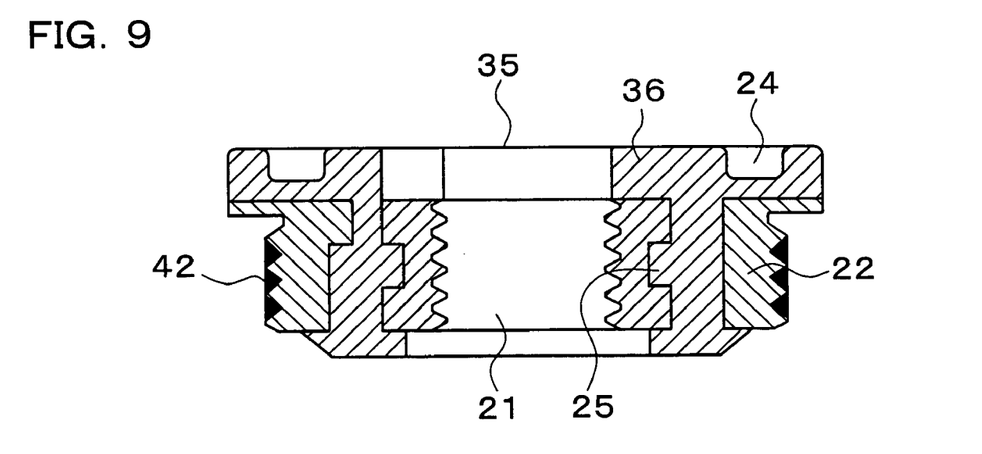
FIG. 9 is a cross-sectional view taken along the line C-C of FIG. 8.

FIG. 9 is a cross-sectional view showing the lower holder 35 shown in FIG. 8 taken along the line C-C. An adhesive 42 is applied on a threaded portion of the external screw 22. This adhesive 42 improves sealing between the external screw 22 and the seat 29 when the external screw 22 of the lower holder 35 is secured to the seat 29 by being screwed therein. A special-formula group adhesive such as LOCK-COAT 80 (trade name) of NIHON NYLOCK Co. Ltd. can be used as one preferably example of this adhesive, however, the adhesive is not specially limited to this.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on applications No. 2003-312049 filed in Japan on Sep. 4, 2003, and No. 2004-146401 filed in Japan on May 17, 2004, the contents of which are incorporated hereinto by reference.

What is claimed is:

1. A fixing structure of a battery for vehicles comprising:
a body frame;
a case which is attached to the body frame and has an attachment hole therein, and the battery is attached to the case;
a sealing member made of rubber or resin and being attached to a rim of the attachment hole of the case, the sealing member having a nut of metal formed by insert molding therein on an inner peripheral side of the sealing member;
a battery holder, which is supported by the sealing member, located at least at one location of the case; and
a bolt which fixes the battery holder by being screwed to the nut of the sealing member via the battery holder.

2. The fixing structure of a battery for vehicles according to claim 1, wherein protruding and recessed portions are formed on an outer periphery of the nut.

3. The fixing structure of a battery for vehicles according to claim 1, wherein an upper holder is made of resin, and has a protrusion formed by a gate is formed in a recessed region the depth of which is larger than the height of the protrusion.

4. The fixing structure of a battery for vehicles according to claim 1, wherein the sealing member includes an upper holder attached onto an upper rim surface of the attachment hole and a lower holder in contact with a lower rim surface of the attachment hole, wherein the lower holder includes the nut formed by insert molding therein on the inner peripheral side and an external screw positioned on an outer peripheral side to be screwed to the frame.

5. The fixing structure of a battery for vehicles according to claim 4, wherein the upper holder has a stopper of a tubular shape with a flange formed by insert molding therein on an inner periphery, wherein an upper end surface of the lower holder makes contact with or moves closer to the lower end of the stopper as the bolt is screwed into the nut.

6. The fixing structure of a battery for vehicles according to claim 5, further comprising an O-ring provided on the upper end surface of the lower holder for sealing with a lower surface of the case in the vicinity of the attachment hole.

7. The fixing structure of a battery for vehicles according to claim 6, wherein retaining portions, which are spaced at an appropriate interval in a circumferential direction, are formed integrally with the lower holder, the retaining portions acting to retain the nut.

8. The fixing structure of a battery for vehicles according to claim 4, wherein the upper holder is made of resin, and has a protrusion formed by a gate in a recessed region of the upper holder, the depth of the recessed portion being larger than the height of the protrusion.

9. The fixing structure of a battery for vehicles according to claim 4, wherein protruding and recessed portions are formed on an outer periphery of the nut.

10. The fix structure of a battery for vehicles according to claim 9, further comprising an O-ring attached onto an upper surface of the lower holder for forming a seal with a lower surface of the case in the vicinity of the attachment hole of the case.

11. The fixing structure of a battery for vehicles according to claim 10, wherein retaining portions, which are spaced at appropriate intervals in a circumferential direction, are formed integrally with the lower holder to retain the nut.

12. The fixing structure of a battery for vehicles according to claim 11, wherein the upper holder is made of resin, and has a protrusion formed by a gate in a recessed region of the upper holder, the depth of the recessed portion being larger than the height of the protrusion.

13. The fixing structure of a battery for vehicles according to claim 9, wherein the upper holder has a stopper of a tubular shape with a flange formed by insert molding therein on an inner periphery of the upper holder, wherein wherein an upper end surface of the lower holder makes contact with or moves closer to the lower end of the stopper as the bolt is screwed into the nut.

14. The fixing structure of a battery for vehicles according to claim 13, wherein retaining portions, which are spaced at appropriate intervals in a circumferential direction, are formed integrally with the lower holder to retain the nut.

15. The fixing structure of a battery for vehicles according to claim 14, wherein the upper holder is made of resin, and has a protrusion formed by a gate in a recessed region of the upper holder, the depth of the recessed portion being larger than the height of the protrusion.

16. The fixing structure of a battery for vehicles according to claim 4, further comprising an O-ring attached onto an upper surface of the lower holder for forming a seal with a lower surface of the case in the vicinity of the attachment hole of the case.

17. The fix structure of a battery for vehicles according to claim 16, wherein the upper holder is made of resin, and has a protrusion formed by a gate in a recessed region of the upper holder, the depth of the recessed portion being larger than the height of the protrusion.

18. The fix structure of a battery for vehicles according to claim 4, wherein retaining portions, which are spaced at appropriate intervals in a circumferential direction, are formed integrally with the lower holder to retain the nut.

19. The fixing structure of a battery for vehicles according to claim 18, wherein the upper holder is made of resin, and has a protrusion formed by a gate in a recessed region of the upper holder, the depth of the recessed portion being larger than the height of the protrusion.

20. A fixing structure for a vehicle battery, the fixing structure comprising:

a case having at least one attachment hole;

a battery holder secured to the case;

a sealing structure comprising an upper holder contacting an upper rim surface of the attachment hole, and a lower holder contacting a lower rim surface of the attachment hole, the upper holder comprising a molded member and an inner metal stopper having a tubular portion and a flange, the lower holder comprising a molded member, a metal nut on an inner peripheral surface of the molded member, and an annular threaded member on an outer peripheral surface of the molded member, wherein the annular threaded member can be screwed into a seat of a vehicle body frame; and a bolt inserted through the battery holder and screwed to the metal nut of the sealing member.

* * * * *